United States Patent [19]

Zook et al.

[11] 4,019,242
[45] Apr. 26, 1977

[54] VACUUM PRESSURE FILL OF VISCOUS DAMPERS

[75] Inventors: Donald G. Zook, Metamora; Kenneth J. Miller; Eugene K. Patton, both of Peoria, all of Ill.

[73] Assignee: Caterpillar Tractor Co., Peoria, Ill.

[22] Filed: Oct. 8, 1975

[21] Appl. No.: 620,620

Related U.S. Application Data

[62] Division of Ser. No. 477,914, June 10, 1974, Pat. No. 3,939,880.

[52] U.S. Cl. .................................... 29/434; 53/37; 219/121 EB; 228/221
[51] Int. Cl.² ........................................ B23P 19/00
[58] Field of Search ................... 29/428, 460, 434; 53/36, 37, 22 A; 74/574; 64/1 V; 188/1 B; 219/121 EB, 121 EM

[56] References Cited

UNITED STATES PATENTS

| 2,347,046 | 4/1944 | Geiger | 141/7 UX |
|---|---|---|---|
| 2,846,829 | 8/1958 | Eskin | 53/37 X |
| 3,349,859 | 10/1967 | Cox et al. | 141/7 X |
| 3,470,671 | 10/1969 | Gettig et al. | 53/37 |
| 3,512,612 | 5/1970 | Bragg et al. | 188/1 B |
| 3,564,813 | 2/1971 | Stell | 53/37 |
| 3,771,380 | 11/1973 | Bahr | 74/574 |

*Primary Examiner*—Charlie T. Moon
*Attorney, Agent, or Firm*—Phillips, Moore, Weissenberger, Lempio & Majestic

[57] ABSTRACT

Method and apparatus for filling viscous dampers in which the method comprises assembling a damper housing with an inertia weight placed loosely therewithin and a housing top having a single aperture therein and adapted to provide a complete closure for the inertia weight, placing the assembly in a vacuum chamber equipped with an electron beam welding device and means for effecting relative movement between the assembly and the electron beam welding device, and inserting a valve and fitting sealingly within said aperture with the valve in an open position, evacuating the vacuum chamber to provide a vacuum within the chamber and within the damper assembly, effecting movement between the assembly and the device to sealingly weld the top to the damper housing, closing the valve, attaching means for supplying a viscous fluid under pressure to said valve, removing the valve from the damper assembly, and welding a plug within the aperture to sealingly retain the fluid within. The apparatus comprises a vacuum chamber, an electron beam welding device mounted for welding within said chamber, means for positioning a viscous damper assembly within said chamber, said damper assembly comprising a damper housing and a cover therefor with an inertia weight disposed therewithin, said damper assembly also comprising a single aperture for filling the damper with a viscous fluid, means for evacuating the vacuum chamber and damper assembly disposed within, means for providing a relative movement between said assembly and said welding device for effecting a complete weld between the housing and cover, and means for filling the welded assembly through said aperture.

4 Claims, 3 Drawing Figures

VACUUM PRESSURE FILL OF VISCOUS DAMPERS

This a division of Ser. No. 477,914, filed June 10, 1974, now U.S. Pat. No. 3,939,880.

BACKGROUND OF THE INVENTION

The present invention relates to a method and apparatus for filling viscous dampers, and more particularly to a method and apparatus for filling viscous dampers in which the fabrication of the dampers include an electron beam welding step.

Torsional vibration dampers which comprise an inertia weight carried in a viscous fluid such as silicone are well known, and the present invention relates to a method and apparatus for making such dampers and in particular to a method of filling said dampers with viscous fluid. In accordance with prior methods, the damper was completely secured together by welding or the like with the inertia weight enclosed therein, and with the top of the housing being provided with two holes. These holes are utilized for filling, with one of the holes being present to provide for egress of air and the other of the two holes being present to provide for entering of the viscous fluid. It is very important that the viscous damper be filled with viscous fluid and substantially no air be present within the housing in order to assure proper operation of the damper assembly when absorbing torsional vibrations and the like. It is also advantageous to utilize electron beam welding in the fabrication of the damper as set forth more fully in Canadian Pat. No. 878,847 issued Aug. 24, 1971 for Torsional Vibration Damper.

In view of the high viscosity fluid being placed within the damper assembly, and the close clearances likely to be present between the inertia weight and the housing wall in certain locations during filling, it is difficult to force viscous fluid into the damper housing and fill the space therein. However, it is important to positively assure that all of the air that might otherwise be present within the housing in the completed unit be removed, and that the interior be sealed so as to retain the interior of the housing free from trapped air and the like which would interfere with the proper operation of the damper. The present invention is directed to an improved method of making and filling said dampers in which improvements are provided both with respect to the simplicity of processing and reliability of manufacture.

SUMMARY OF THE INVENTION

In accordance with the present invention, torsional vibration dampers of the character described are filled by evacuating the housing to remove substantially all of the air therein, supplying a viscous fluid through a single aperture to fill the evacuated space within the housing, and sealingly securing a plug in said aperture to provide a complete airtight viscous fluid-filled housing interior.

Thus, the present invention utilizes a single aperture for removal of air from within the housing and for filling the housing with viscous fluid. In this way, the manufacture of the device is simplified by utilizing only one aperture for filling and therefore requiring only one aperture to be plugged in the final fabrication step. In addition, the use of a single aperture for filling provides for a simple quality control with respect to the sealing relation of the housing itself, because any tendency of air to leak into the housing during the filling step can be easily detected. Therefore, the method of the invention provides the simple quality control in fabricating the viscous damper in accordance with the invention.

In addition, the method of this invention provides for a simplified process of making viscous dampers by utilizing a step of providing a vacuum for two different purposes. In other words, in the preferred method of making a viscous damper in accordance with this invention, the damper housing and top is sealingly secured by electron beam welding in a vacuum chamber. The vacuum, which is utilized for the electron beam welding, process, is also utilized to provide the vacuum within the interior of the welding housing incident to the filling operation described above.

Thus in a preferred method, the housing is finally secured by electron beam welding to provide a sealed interior, with the electron beam welding taking place within an evacuated vacuum chamber. Prior to effecting the welding step, the housing is assembled with the inertia weight therein, and a valve is placed in a single aperture provided in the damper housing. The valve is left open so as to assure that the evacuaction of the vacuum chamber will also provide evacuation for the interior of the damper housing. The electron beam welding is then effected, and the valve is closed. The vacuum chamber may then be allowed to assume normal atmospheric pressure, and the valve is attached to a source of viscous fluid with the attachment being made in such a way that no air is present between the valve connection and the viscous fluid source. The valve is then opened and the viscous fluid is forced into the interior of the housing through the aperture with the vacuum within the housing assisting in bringing the viscous fluid into position, and assuring that the housing is filled with viscous fluid.

Since the housing should be completely sealed after the welding is completed, the time required to fill the device with viscous fluid will be relatively constant, unless a leak is present that would allow air to enter the interior of the housing. In such a case, the apparent filling would not occur during the expected time period and the malfunction would be obvious to the operator.

It should be noted that an important characteristic of the method of this invention is the utilization of a single aperture for removing air and supplying viscous fluid to the interior of the damper housing. It may also be noted that it is generally conventional to provide the aperture at the top of the housing for easy application of a product for sealing the interior. However, it will be appreciated that the use of a single aperture allows the aperture to be placed in the housing itself, and it may be advantageous to provide the aperture somewhere on the side of the damper housing instead of within the lid. This relocation is made possible by virtueof the single aperture and the fact that a single aperture may be located on the side of the housing and still be oriented to the uppermost position of the unit during subsequent operational steps.

In its apparatus form, the apparatus comprises a vacuum chamber equipped with means for effecting electron beam welding in accordance with conventional electron beam welding procedures. The apparatus also comprises means for effecting relative movement between the damper housing and the electron beam welding apparatus so that the welding may be accomplished in all of the areas which are to be welded. In other words, a typical damper will have an annular chamber carrying a ring-shaped inertia weight, and a cover or top which is in the form of a flat disk adapted to complete the annular space within and provide a flange for attachment to the vehicle in the usual way. With this construction, the cover will be welded onto the annular housing by two concentric circular welds with one on each side of and at the top of the annular space within the housing.

The means for effecting relative rotation between the electron beam welding device and the damper, is preferably constructed to provide for rotation of the damper with respect to the electron beam welding device. In order to move to the second circular weld, the electron beam welding device is then displaced laterally and rotation of the housing again effected so that the two concentrically disposed circular welds may be formed. The apparatus also will comprise a valve having a fitting adapted to sealingly fit into the aperture provided in the damper housing or cover, pump means operatively connected to a source of viscous fluid to be provided within the housing and a suitable passage leading from the pump means to said valve.

In the preferred method utilizing the apparatus specifically described herein, the aperture is placed on the housing cover, and the valve is provided with a handle disposed to be actuated by the electron beam welding device at the termination of the welding operation, whereby automatic closing of the valve occurs within the vacuum chamber. In accordance with this procedure, however, with the the valve in the cover of the device, it is necessary to have the hose from the supply source of viscous fluid removed from the valve in order to allow proper welding to occur on each side of the valve. However, this hose is easily connected and disconnected as required. It will be appreciated that the valve could be placed in an aperture located in the side of the housing where the connection to the filling device could be retained at all times. With such an arrangement, the valve could be a three position valve whereby the interior of the housing is communicated to the interior vacuum chamber in one position, the valve shut-off in the second position, and the valve communicating to the supply source in still another position. In such a case, the valve would be actuated at the end of the welding step to shut off the valve, the chamber opened and the valve turned on. Alternatively, a two-position valve could be provided, in which a shut-off position is not utilized, but instead the valv is switched from the communication to the interior of the vacuum chamber to the supply source upon completion of the welding operation. With such an arrangement, the filling could take place entirely within the vacuum chamber, or other variations in the process could be provided. In this last precedure any leaks in the damper housing would become apparent because fluid would migrate therethrough to reach the evacuated chamber. Accordingly, all of these operational variations are to be construed to be within the ambit of the present invention.

It is thus seen that a primary object of the present invention is to provide an improved method and apparatus for filling vibrational torsion dampers with viscous fluid in which the filling operation is carried out in a simplified and more reliable manner.

Another object of the invention is to provide a method and apparatus for filling and making viscous dampers in which a single aperture is utilized for filling and in which only said single aperture needs to be plugged up in the final assembly step to achieve complete sealing.

A further object of the invention is to provide a method of making viscous dampers in which quality control is built into the procedure whereby simplified production of reliable dampers is positively assured.

Further objects and features of advantage of the invention will become apparent as the specification progresses.

BRIEF DESCRIPTION OF THE DRAWINGS

A preferred form of the invention is illustrated in the accompanying drawings forming part of this description, in which.

While only the preferred form of the invention is shown, it should be understood that various changes or modifications may be made within the scope of the claims attached hereto without departing from the spirit of the invention.

DETAILED DESCRIPTION OF THE PREFERRED EMBODIMENT

Figure 1:
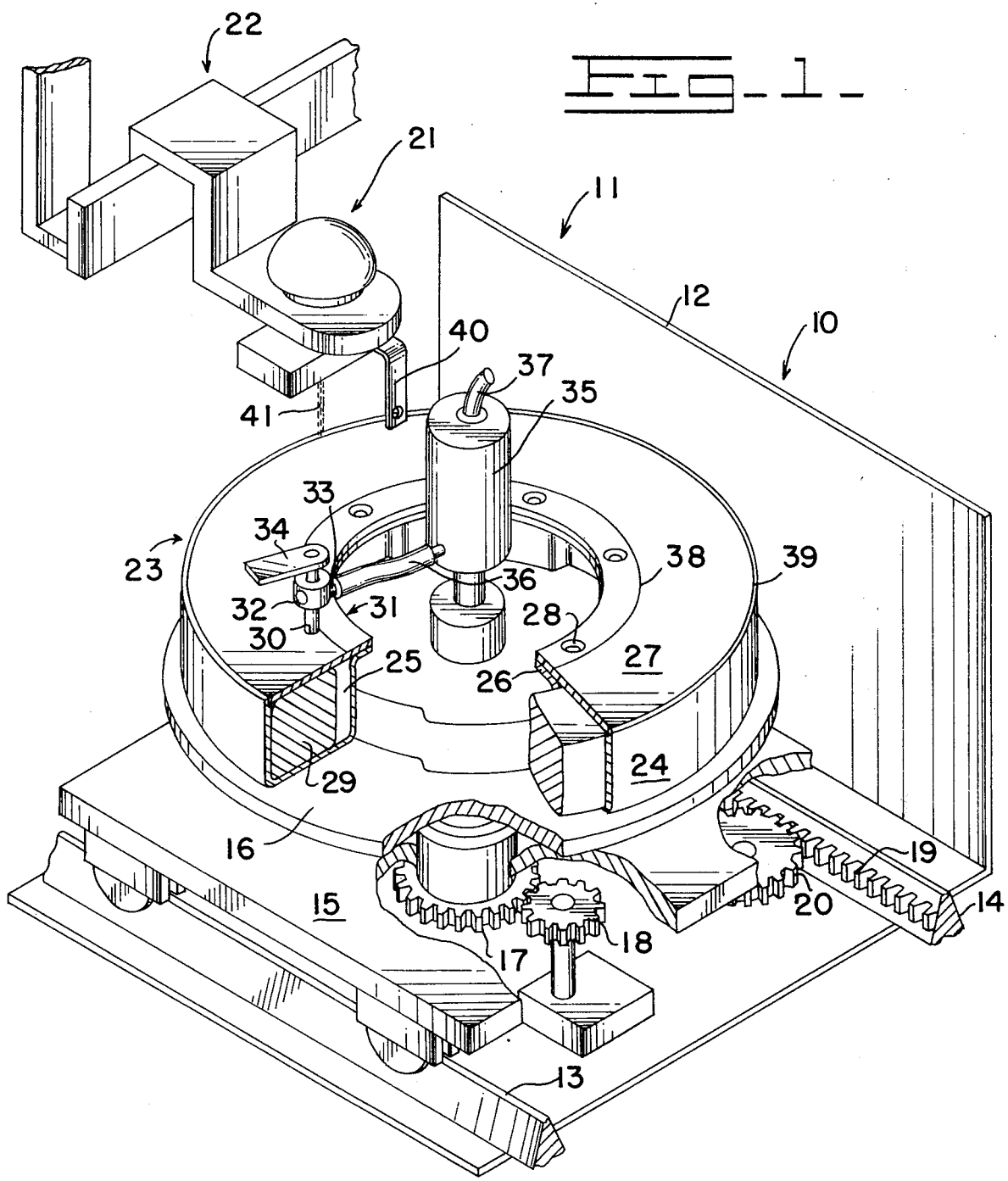
FIG. 1 is a perspective view of an apparatus of the invention with a viscous damper shown in place therein and with certain of the parts being broken away to show interior elements.
Figure 2:
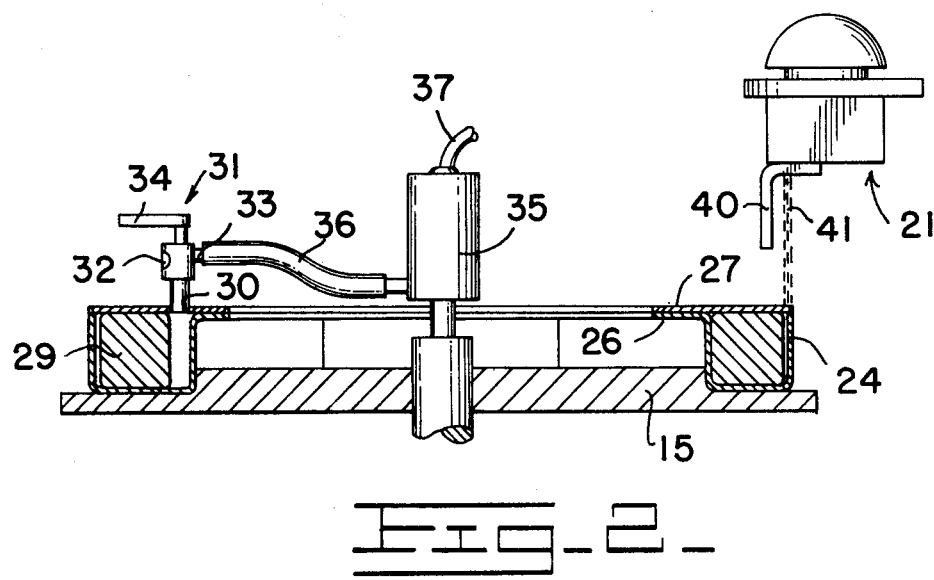
FIG. 2 is a fragmentary side elevational view of a portion of the apparatus in its operative stage showing the viscous damper in section.

Referring more particularly to the drawings, there is shown in FIG. 1 an apparatus 10 constructed in accordance with the invention. The apparatus comprises a vacuum chamber 11, formed by a housing 12, and various other conventional structures (not shown) generally associated with vacuum chambers such as exhaust pumps, and the like. The chamber is equipped with rails 13 and 14 for supporting a wheeled table 15 and for allowing movement of the table into and out of the chamber 11. Table 15 comprises a rotatable pedestal 16 mounted thereon and journalled therethrough with its lower end connected to a spur gear 17 provided for rotating the pedestal 16. A spur gear 18 is provided in vacuum chamber 11 and positioned to engage the spur gear 17 as the table is brought into operative position. Spur gear 18 is journalled through the floor of the vacuum chamber and connected to a power source (not shown). A rack 19 is also provided on the underside of table 15, with the rack engaging spur gear 20, which is also journalled through the floor of the vacuum chamber and externally powered for moving the table into position within the vacuum chamber.

The apparatus 10 also comprises an electron beam welding device 21 mounted on suitable frame members 22 within the vacuum chamber 11. This welding device operates in a vacuum and provides a welding operation that has the advantages of deep penetration and elimination of distortion all without the use of additional welding materials.

The apparatus 10 is constructed to receive a torsional vibration damper assembly 23 on the pedestal 16 as shown in FIG. 1. The torsional vibration damper assembly 23 comprises a main housing 24 which is generally U-shaped in cross section and provides an annular chamber 25 therewithin. The main housing 24 also has an internally extending flange 26 formed as shown to provide a flat upper surface in contact with top 27. The top 27 and flange 26 are equipped with suitable bore holes 28 for securing the device in place on the crankshaft of a vehicle or at any other desired location. An inertia weight 29 is provided within the annular chamber 25, and this completes the assembly as it is provided in vacuum chamber 11. However, it should be noted that the top 27 of the torsional vibration damper assembly 23 also comprises an aperture 30, and that this aperture is the only opening communicating between the interior and exterior of the damper assembly.

The apparatus 10 also comprises a valve 31 equipped with a suitable fitting adapted to fit sealingly within aperture 30. As here shown, valve 31 is a three-position valve communicating in one position to an orifice 32, in a second position shut-off, and in the third position, to a conduit 33; said positioning being effected by handle 34.

The apparatus 10 also comprises a container 35 having an outlet hose 36 adapted to fit onto conduit 33. A conduit 37, is also provided to supply viscous fluid into the chamber 35 under pressure by means of a pump (not shown), so that the fluid may be moved through hose 36, conduit 33, valve 31, aperture 30 and into annular chamber 25.

The operation of the apparatus shown in FIG. 1 is substantially as follows:

Torsional vibration damper assembly 23 is positioned on the rotatable pedestal 16 and wheeled into vacuum chamber 11 on rails 14. When rack gear 19 reaches engagement with spur gear 20, the table may be driven through spur gear 20 into position. Once the operating position is achieved, gears 18 and 17 will come into engagement and the electron beam welding device 21 will be in a beginning position to weld the top 27 onto the main housing 24. It should be noted that the torsional vibration damper assembly 23 has valve 31 sealingly placed in aperture 30 and with the valve open so that orifice 32 is in communication to the interior annular chamber 25 of the damper assembly 23.

With the damper assembly thus in position in the vacuum chamber 21, the chamber is sealed and evacuated in order to provide a vacuum therein. This vacuum not only exists within the chamber, but also within the annular chamber 25 of damper assembly 23 so as to simultaneously provide a vacuum within the damper assembly while providing a vacuum for electron beam welding. The electron beam welding operation is then carried out to provide a circular weld along circle 38 as shown in FIG. 1 to secure top 27 of the damper assembly to the flange 26 of the main housing. The beam is moved laterally and welding is then directed around edge 39 to secure the outer portion of top 27 to the main housing 24. This welding completely integrates the top 27 into the housing 24, and provides a single sealed unit, except for aperture 30.

It will be noted that electron beam welding device 21 is equipped with an actuating member 40 positioned to contact handle 34 and close valve 31. Each of the circular welds is achieved by electron beam 41 positioned to strike the appropriate circle and by driving gear 18, which in turn rotates gear 17 and rotatable pedestal 16 to provide the desired rotation to the torsional vibration damper assembly 23. Each weld circle may be conducted simultaneously, or separately, from two different beam sources. Alternatively, two weld circles can be made from a single beam by means, such as an air cylinder (not shown), for moving the beam 41 laterally from one circular position to the other.

After the welding has been completed and the valve shut-off, the vacuum chamber is allowed to assume atmospheric pressure and the outlet hose 36 is secured to conduit 33 to supply viscous fluid into valve 31. It is important in making this connection that no trapped air be present in the conduit or in the hose, so that the complete contact of viscous fluid is made right up to the valve member in communication with the vacuum within annular chamber 25. With the connection thus made, valve 31 is positioned to communicate with container 35 and viscous fluid is forced under pressure into the chamber 25. It will be noted, that the vacuum in chamber 25 not only solves the problem of air removal therefrom during filling, but also assists in bringing in the viscous fluid and enabling it to fill all of the close-fitting spaces.

It will also be appreciated that a quality control is apparent to the operator at this point, because any leaks would destroy the vacuum inside the vibration damper assembly. This would change the apparent filling time and alert the operator to be aware of an imperfect unit.

Figure 3:
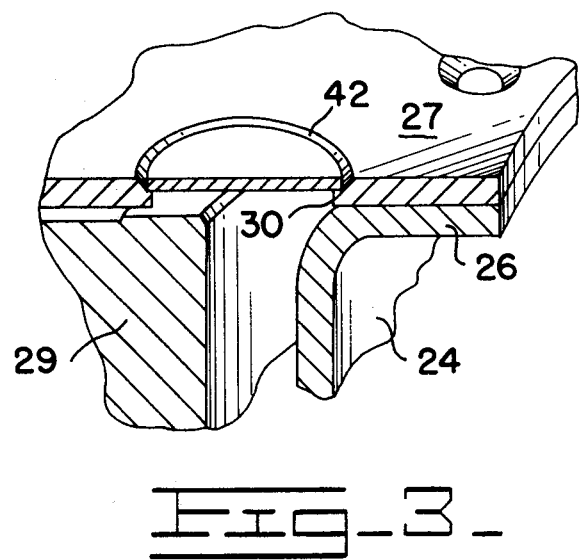
FIG. 3 is a fragmentary isometric view of the finally plugged portion of the damper.

Thus, it is seen that the apparatus 11 is utilized in partially carrying out the filling method and in making a viscous damper according to the invention, and that the method is used to complete the overall filling operation. In its method aspect, the manufacture of the damper assembly is continued after filling by removal of the valve 31, and welding of a plug 42 into the aperture 30 as illustrated in FIG. 3.

In the foregoing description, it is seen that an improved method of filling the viscous dampers is provided in which the filling method is incorporated into a procedure for making the damper itself with economy of fabrication steps being achieved together with advantageous results. Specifically, the method of this invention provides improvements in the manner of handling of trapped air and positively assures the absence of any substantial amount of air within the completed damper assembly. This is particularly important in certain damper articles which contain synthetic coatings on the inertia weight, which coatings are subject to corrosion caused by air. Thus an anaerobic surrounding is desirable for these types of structures. The removal of air contact by evacuation of air prior to the filling with viscous fluid is advantageous in assuring complete removal of contacting air and avoidance of continued contact of air with said coatings after assembly. The invention is also particularly applicable to improvements in making damper assemblies which are already known and proven to be eminently satisfactory for their intent and purpose, because the method is in no way dependent upon the specific shape or materials utilized in the damper assembly itself.

From the above description it is seen that an improved method of filling viscous dampers is provided together with an improved method and apparatus for making viscous dampers employing this filling method. It is also seen that said improved method provides an economy of construction together with improved reliability in the fabrication process.

What is claimed is:

1. A method of making a viscous damper, comprising the steps of
    placing a damper assembly into a vacuum chamber, said damper assembly comprising a housing, an inertial weight, and a housing cover, with the housing and cover having a single aperture therein, and providing a complete enclosure except for said aperture, evacuating the chamber and the space around the inertia weight within the damper housing, welding the cover onto the housing in said evacuated chamber, pumping a viscous fluid through the aperture and into the evacuated space within the damper assembly to fill said space with viscous fluid, and sealingly securing a plug in said aperture.

2. A method of making a viscous damper as defined in claim 1, which also comprises the steps of placing a valve and fitting therefor sealingly within the aperture, and operating the valve to provide a communication between the space within the damper assembly and the vacuum chamber to assure evacuation of the space as the chamber is evacuated.

3. A method of making a viscous damper as defined in claim 2, in which the welding step is carried out by an electron beam welding process.

4. A method of making a viscous damper as defined in claim 2, in which the aperture is located in the housing cover.

* * * * *